United States Patent
Vigen et al.

(10) Patent No.: US 7,835,221 B2
(45) Date of Patent: Nov. 16, 2010

(54) OPTICAL METHODS AND SYSTEMS IN MARINE SEISMIC SURVEYING

(75) Inventors: Erik Vigen, Honefoss (NO); Luren Yang, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 99 days.

(21) Appl. No.: 11/456,059

(22) Filed: Jul. 6, 2006

(65) Prior Publication Data
US 2008/0008031 A1    Jan. 10, 2008

(51) Int. Cl.
*G01V 1/38* (2006.01)
(52) U.S. Cl. .......................................................... 367/19
(58) Field of Classification Search .................... 367/58, 367/106, 15–19
See application file for complete search history.

(56) References Cited

U.S. PATENT DOCUMENTS

| | | | |
|---|---|---|---|
| 2,407,680 A | | 9/1946 | Palmquist et al. |
| 3,190,178 A | | 6/1965 | McKenzie |
| 3,417,959 A | | 12/1968 | Schultz |
| 3,585,415 A | | 6/1971 | Muller et al. |
| 3,922,065 A | | 11/1975 | Schultz |
| 3,935,365 A | | 1/1976 | Eigenmann |
| 4,075,049 A | | 2/1978 | Wood |
| 4,182,548 A | | 1/1980 | Searight et al. |
| 4,231,111 A | * | 10/1980 | Neeley ........................ 367/19 |
| 4,332,437 A | | 6/1982 | Searight et al. |
| 4,367,857 A | | 1/1983 | McCarthy |
| 4,404,664 A | * | 9/1983 | Zachariadis .................. 367/19 |
| 4,511,210 A | | 4/1985 | Tung et al. |
| 4,521,875 A | * | 6/1985 | Harrington .................. 367/130 |
| 4,532,617 A | * | 7/1985 | Baecker et al. ................. 367/19 |
| 4,569,920 A | | 2/1986 | Smith-Johannsen |
| 4,626,127 A | | 12/1986 | May |
| 4,660,185 A | * | 4/1987 | French ......................... 367/19 |
| 4,669,067 A | * | 5/1987 | Roberts ........................ 367/19 |
| H388 H | * | 12/1987 | Lloyd ........................... 367/19 |
| 4,719,987 A | | 1/1988 | George, Jr. et al. |
| 4,726,315 A | * | 2/1988 | Bell et al. .................... 114/244 |
| 4,777,501 A | * | 10/1988 | Caimi et al. .................. 396/28 |

(Continued)

FOREIGN PATENT DOCUMENTS

GB     2414804 A1     12/2005

OTHER PUBLICATIONS

Loweth, "Manual of offshore surveying for geoscientists and engineers", Chapman&Hall, London, 1997, pp. 158-164.*

(Continued)

*Primary Examiner*—Jack Keith
*Assistant Examiner*—Krystine Breier

(57) ABSTRACT

Methods and systems for determining position of marine seismic spread components are disclosed. One method comprises exposing an underwater marine seismic spread component to an optical device, and calculating geometry of the spread component using at least some of the data obtained by the optical device, for example travel time for an optical signal to travel to and return from one or more spread elements in the spread component. The optical device may comprise one or more laser scanners, cameras, or laser scanners and cameras. The spread component may be a marine seismic source, a marine seismic streamer cable, and the like. This abstract allows a searcher or other reader to quickly ascertain the subject matter of the disclosure. It will not be used to interpret or limit the scope or meaning of the claims.

16 Claims, 4 Drawing Sheets

U.S. PATENT DOCUMENTS

| | | | |
|---|---|---|---|
| H549 H * | 12/1988 | Lloyd | 367/19 |
| 4,895,440 A * | 1/1990 | Cain et al. | 356/5.08 |
| 4,896,943 A | 1/1990 | Tolliver et al. | |
| 4,897,136 A | 1/1990 | Bailey et al. | |
| 4,992,990 A * | 2/1991 | Langeland et al. | 367/19 |
| 5,029,145 A * | 7/1991 | Marsden et al. | 367/56 |
| 5,042,942 A * | 8/1991 | Brimberg et al. | 356/3.13 |
| 5,054,272 A | 10/1991 | Dundas | |
| 5,064,272 A | 11/1991 | Bailey et al. | |
| 5,066,098 A | 11/1991 | Kult et al. | |
| 5,109,362 A * | 4/1992 | Berni | 367/14 |
| 5,117,400 A * | 5/1992 | Penn et al. | 367/128 |
| 5,146,287 A | 9/1992 | Carder | |
| 5,181,135 A * | 1/1993 | Keeler | 398/104 |
| 5,270,780 A | 12/1993 | Moran et al. | |
| 5,309,212 A * | 5/1994 | Clark | 356/5.09 |
| 5,359,575 A * | 10/1994 | Williams et al. | 367/127 |
| 5,432,515 A * | 7/1995 | O'Conner | 342/23 |
| 5,448,936 A * | 9/1995 | Turner | 89/1.13 |
| 5,493,388 A * | 2/1996 | Adachi | 356/5.01 |
| 5,511,039 A | 4/1996 | Flentge | 367/56 |
| 5,761,153 A * | 6/1998 | Gikas et al. | 367/19 |
| 6,028,822 A * | 2/2000 | Lansley et al. | 367/62 |
| 6,057,909 A * | 5/2000 | Yahav et al. | 356/5.04 |
| 6,097,424 A | 8/2000 | Zernov et al. | |
| 6,115,511 A * | 9/2000 | Sakai et al. | 382/312 |
| 6,252,222 B1 | 6/2001 | Kasapi et al. | |
| 6,256,090 B1 * | 7/2001 | Chen et al. | 356/73.1 |
| 6,366,533 B1 | 4/2002 | English | |
| 6,420,976 B1 | 7/2002 | Baggs et al. | |
| 6,476,853 B1 | 11/2002 | Zernov et al. | |
| 6,512,887 B2 | 1/2003 | Inoue et al. | |
| 6,552,965 B2 | 4/2003 | Brandt et al. | |
| 6,707,761 B2 | 3/2004 | Erikson | |
| 6,946,618 B2 | 9/2005 | Tamura et al. | |
| 6,970,578 B1 | 11/2005 | Strand | |
| 6,987,527 B2 | 1/2006 | Kosen | |
| 7,203,130 B1 * | 4/2007 | Welker | 367/16 |
| 2004/0070770 A1 | 4/2004 | Desharnais et al. | |
| 2006/0209634 A1 * | 9/2006 | Vigen | 367/21 |
| 2007/0091719 A1 * | 4/2007 | Falkenberg et al. | 367/19 |

OTHER PUBLICATIONS

Loweth, "Manual or offshore surveying for geoscientists and engineers", Chapman & Hall, London, 1997, pp. 158-164.*
Swartz, "Laser Range Gate Underwater Imaging Advances", IEEE, 1994.*
http://gis.leica-geosystems.com/LGISub1x3x0.aspx.
http://www.trimble.com/trimblegx.shtml.
A. Ziolkowski et al., "The signature of an air gun array: computation from near-field measurements including interactions", Geophysics 47(10):1413-1421 (1982).
International Search Report on PCT application No. PCT/US2007/071878, dated Dec. 4, 2007.

* cited by examiner

OPTICAL METHODS AND SYSTEMS IN MARINE SEISMIC SURVEYING

BACKGROUND OF THE INVENTION

1. Field of Invention

The present invention relates generally to the field of marine seismic surveying, and more specifically to using optics to more accurately quantify marine seismic data.

2. Related Art

Marine seismic exploration investigates and maps the structure and character of subsurface geological formations underlying a body of water. In one common arrangement, a seismic spread comprises one or more streamer cables containing acoustic seismic receivers deployed into the water behind a tow vessel, and one or more acoustic seismic sources may be towed by the same or different vessel. Less than perfect knowledge of the actual positions of the source elements at the time of firing and receivers at the time of arrival of reflected seismic waves may result in less than acceptable seismic data.

SUMMARY OF THE INVENTION

In accordance with the present invention, optical methods and systems are described to determine geometry of one or more spread components. As used herein, a "spread component" may mean a streamer cable, a streamer steering device, a seismic source, a vessel, a buoy, a deflector, and, in the extreme case the entire spread. A spread component may be comprised of one or more spread elements. For example, an acoustic source may be comprised of one or a plurality of acoustic seismic source elements, such as air-guns, vibrators, loud speakers, and the like. A streamer cable may have a plurality of streamer cable elements or sections, and a plurality of seismic instrument elements in each section. As used herein "geometry" includes, but is not limited to, size, shape, and position (in any chosen reference system). Methods and systems of the invention reduce or overcome problems with previous systems and methods, and may be used during collection of, and/or to correct marine seismic data, for example 3-D and 4-D (time lapse) marine seismic data. In one embodiment, for example, the invention determines the relative positions of seismic source elements in a seismic source.

A first aspect of the invention are methods, one method comprising:

(a) exposing an underwater marine seismic spread component to an optical device; and (b) calculating geometry of the spread component using at least some of the data obtained by the optical device.

Methods of the invention include those methods wherein the exposing comprises scanning an underwater marine seismic spread component with an optical signal from an optical scanner, and the calculating geometry comprises using travel time for the optical signal to travel to and return from one or more spread elements in the spread component. In certain embodiments the optical scanner comprises one or more lasers to point at reflectors on the spread elements and measure the two-way travel time. Methods using this approach may be used to produce a network of optical ranges. An advantage over the acoustic approach is that only a simple reflector is needed, which may be in or on the spread element, i.e., at the end of the range. The reflector may be selected from reflective tape, reflective paint, a prism, or similar functioning reflector that may be attached directly on the spread element surface, integrated in the surface of the spread element, or both. The laser would in these embodiments be a node in the network of optical ranges, but the laser(s) does (do) not need to be co-located with any particular spread element. The optical signal may be continuous or discontinuous while measuring; some interruptions are tolerated. In certain embodiments scanning may comprise sending laser pulses, and calculation of distances may comprise measuring the time delay of the reflected signals. The scanning may comprise pointing the optical signal directly on the reflector or the reflective surface. The typical embodiment of a marine seismic source does not offer any stable mounting platform where correct pointing direction could be ensured. This problem may be solved by laser scanning. In certain embodiments, "exposing an underwater marine seismic spread component to an optical device" may comprise rotating an optical element, such as a mirror or a prism that bends the light rays from a laser so that each light pulse is sent in a different angle forming a fan of light pulses. Using a second optical element, it is possible to direct the light pulses in a spherical sector large enough to ensure that there is a pulse hitting each of the reflectors. Methods of the invention include those having one, two, or more optical scanners. Methods of the invention include those wherein reflectors are on each of the spread elements, for instance air-guns that require determination of relative position. Light reflected from each reflector has a significantly higher intensity than other reflections. Methods of the invention include identifying the reflection point as being a target point of interest and thereby extracting that range measurement for use in the network computation, thereby filtering out less useful range data before using the data in a network of optically measured ranges. The reflectors could be as simple as a piece of reflective tape or paint, a simple reflector such as used on cars and bicycles or by pedestrians, or a prism.

In certain embodiments, water may contain small air bubbles that will disperse the light so that the rays do not hit the intended targets. Methods of the invention include those wherein the size of the beams and/or means for reflection are adjustable so that a light ray passing a few millimeters to the side of the bubble will still hit the intended target and make a measurement possible.

In certain embodiments, advantage is taken of the fact that lasers may exhibit very fast measurement cycles, and measurements may be taken virtually continuously, even during firing of source elements. At some time after a source element is triggered, the measurements may fail, for instance when using air-guns the water will be filled with air bubbles. Of course, in the case of seismic sources, the geometry sought is the one representative at the moment the source elements fire. The fast measurement rate of lasers makes it possible to select the data set taken closest to the time of firing and make a network solution from that. The rest of the data may then be discarded. The calculation may comprise computing a network, and this may include one or more computers to receive the measured ranges and process the data using an appropriate algorithm. If the computer has capacity and there is a desire to track a spread component between seismic shots it is of course within the invention to also compute updates more frequently.

In exemplary embodiments of determining source geometry, scanning may include using a laser ranging system that has laser scanners positioned in front of the source and the reflectors consequently on the front end of each source element. This way the laser is towed out of the air-disturbed water and new measurements become possible after each of the source elements exit the air-disturbed water. A conventional source has all its elements located approximately in a horizontal plane. In these embodiments it may be an advantage to locate the laser scanners slightly below that plane so that all source elements are easily visible from them. All lasers and reflectors will become nodes in a positioning network of optical ranges. In order to calculate geometry of the source at least one additional piece of information may be needed. In a generic sense this information is the piece necessary to uniquely describe the size and shape of at least one triangle formed by any three nodes not being on a straight line. In most practical cases this additional information would not be determined by the optical range measurements. The baseline may also be specified in terms of relative coordinates of its end points. The depth is normally known from other measuring devices deployed.

If the spread component geometry is three-dimensional the issue is similar, but the supplemental information needed is what is required to uniquely define a tetrahedron rather than a triangle. In practice it may be three baselines or relative coordinates of three nodes.

The optical scanner may emit visible light, for instance red, blue-green, or invisible light, for example near-infrared or ultraviolet. Optical scanners for different wavelengths may be used if an image or video of the spread component is desired.

If the position of at least any two points in the network of optical ranges is determined in an external reference frame, e.g. a global frame, the positions of each spread element may be calculated in the same reference frame should need be. If the network is 3D then at least three points need to be determined externally or some other information as mentioned above needs to be added. The external position could be determined using for instance an acoustic positioning system in combination with a satellite positioning system.

Another group or set of methods within the invention include those wherein the optical device comprises at least one camera compatible with marine conditions. In some embodiments two or more cameras may be used. In essence, these methods comprise taking stereo photographic images of the spread component of interest. Using stereo images it is possible for example to determine geometry, such as shape, of a seismic source, or a seismic streamer. In order to determine spread component size it is necessary to have a known reference baseline distance. The baseline distance may be given as an accurate distance between the focal points of the two cameras, or it could be given as the distance between two points appearing in the images. If there is sufficient light to get contrasts in the images nothing more is needed to complete the data acquisition. The contrast may be improved by applying artificial light in various forms as explained herein.

Methods in accordance with the invention include measuring image coordinates of one and the same point or mark on a spread element in two images exposed at two different locations. This makes it possible to determine the 3D coordinates of the point in a stereographic model. Repeating this process for a multitude of points makes it possible to determine their relative positions. As the number of points increases the stereographic model becomes closer to a three-dimensional image of the spread component. If the spread component was stationary one could just move the camera around and take the snapshots at different times. When the position and shape change with time it may be necessary to use two cameras to take the two pictures simultaneously.

Other methods of the invention include calibrating the cameras to reduce or eliminate distortions of the lenses, deviation of the projection surface from a plane, and other effects affecting the image coordinates. Given this information the errors can be compensated for. Thus, other inventive methods comprise determining shape of a spread component using calibrated cameras, and optionally obtaining the size (scale) of the spread component using a known baseline distance, which may be selected from a distance between the two cameras, a known distance between two marks on the spread component, or a measured distance, for instance the distance from the camera to a mark on a spread element.

Yet other methods of the invention comprise automating the process through use of digital cameras, or digital video cameras. Fast update rates would be enabled using digital video cameras. As with laser ranging one could then choose the image nearest to the time of interest to use for processing to find the geometry wanted, or images could be processed at the rate the computer has capacity to support.

Variations of these methods include processing the images in a computer with one or more algorithms to convert pixels to desired coordinates.

The quality of the images may be an issue for a successful process. In daylight conditions and clear water it may be possible to take the snapshots without adding any light. Methods of the invention include enhancing contrast in the images using artificial lights to ease identification of the correct marks. The artificial lights could for instance be obtained from an ordinary flash. A better approach may be to position lights in place of the marks on the spread elements. Where a flash is employed, one or more light reflectors may be used.

A third group or set of methods of the invention comprises combining the inventive laser and camera methods described herein. One inventive method comprises optical scanning using a co-located laser scanner and a camera, wherein the laser scanner and camera are separate units located very close together (paired). One or multiple pairs may be used in the exposure step. Another inventive method uses an imaging laser scanner, where rather than using co-located camera and laser scanner pairs, the functions of imaging and laser scanning are combined in one unit; one or multiple imaging laser scanners may be employed in the exposure step. The laser would then fill a dual purpose in that it illuminates reflectors on the spread elements to create good contrast in the image and measure the ranges at the same time. Optionally, the methods comprise positioning a camera/laser scanner pair, or an imaging laser scanner, in a center position ahead of the source, which might be a more practical way of deploying the gear.

This combined approach will also work for spread components having three dimensional geometry. The positioning principle used in this method is essentially that the images will provide angles, or directions if you like, between/to the reflectors while the laser scanner provides the distances. Given the direction of a vector and its length it is trivial to find its end point coordinates. In order to establish coordinates in an external reference frame using these methods, one option comprises positioning two or more points externally and transform coordinates based on this. Another option comprises measuring the position and three-dimensional attitude of the camera/laser unit using, for instance, an acoustic positioning system and satellite positioning system, and an inertial platform on the unit.

Yet other methods of the invention comprise duplicating the system used for the third aspect, making possible to do all the three methods. This may be a further advantage in a difficult environment, as it would give superb redundancy within the system. The methods would then be far more tolerant to failed or false measurements.

Methods in accordance with the invention include those wherein the source elements may be selected from air-guns or other devices capable of producing acoustic signals, such as vibrators, explosives, dropped weights, and the like, which may be suspended from or connected to floats. The source elements may be hung from or otherwise located below the floats by known distances, for example by chains or ropes of known distance, or solid members of known distance. In this way the position and orientation of the floats and the source elements may be estimated in an Earth-fixed reference frame independent of the sea level or wave action for instance using satellite positioning on the sea surface.

Calculating geometry may be accomplished using a vessel-located on-board computer or remote computer, and may include algorithms and other software. A telemetry system adapted to transmitted data between the optical scanners, detectors, and the like may be provided. The calculation unit may operate through wired connections, fiber optic connections, wireless, acoustic communication, or any combination thereof.

A second aspect of the invention are systems able to carryout the methods of the invention, as explained more fully herein. Systems of the invention may comprise one or more optical devices, and one or more marine seismic spread components, which may be a vessel, which may be towing an entire spread seismic spread (source and streamers), or only a source or only the streamers, with a second vessel towing the complimentary equipment. Systems of the invention may include sub-systems on the vessel such as navigation computers, positioning computers, and the like. The vessel may include one or more transmitters, for example for use in acoustic positioning, communications modules allowing communication between the vessel and a remote location or another vessel.

Methods and systems of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
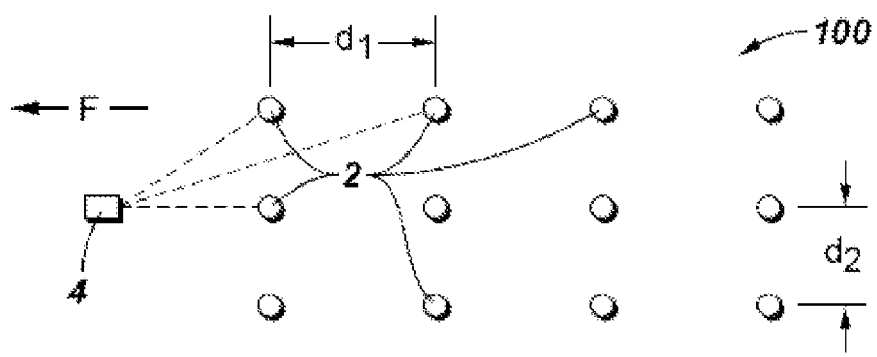
FIGS. 1-8, inclusive, are schematic plan view illustrations of eight non-limiting embodiments of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

When performing marine seismic imaging of the subsurface strata one needs to establish the position and depth of the seismic source and the receivers. A common way of characterising the signature of a marine seismic source signal depends on precise knowledge of the source geometry. That means knowing with high precision the travel time from any source element, such as an air gun, to each of the near field acoustic (seismic) receivers commonly deployed on the source to measure the signal. When the speed of sound in water is known this translates into knowing the distances, and because the distances needed go in multiple directions from each seismic receiver its solution is equivalent to determination of the relative positions of the source elements with a sufficient accuracy.

Most often today acoustic ranging is used, perhaps combined with a satellite positioning system, to estimate 3-D coordinate positions of underwater seismic source elements, as well as size and shape of the underwater source comprised of several source elements. Optical methods have not been employed, probably because of the main perceived major obstacle in using light, whether visible, infrared or ultraviolet: in water, light gets dispersed very quickly so that it does not penetrate very far. It is generally true that clay substances or other substances in water may add to this problem. However, a marine seismic source and its source elements are normally operated in relatively clear water, and the source dimensions do normally not exceed 10-20 meters.

Thus far systems relying on combinations of acoustic ranging and satellite positioning systems, even those that may employ massively redundant acoustic nets and multiple satellite signal receivers at strategic points in a spread to determine the surface position of a vessel, or buoys tethered to streamers and sources, still may not provide accurate enough knowledge of the actual position, size, and geometry of the source.

Today source shape and position are most often estimated using satellite signal receivers attached to the source floats on the surface. The position, possibly a three dimensional position, has then been assumed for the source elements underneath based on the satellite signal receiver positions and models of the source and known dimensions of the suspension system under the floats. This approach has insufficient accuracy for obtaining the optimal results. No prior art is known to measure the geometry in the water either internally on the seismic source or from the floats on the surface, but the most likely technique that might have been attempted is by use of acoustic ranging. A difficulty with this approach is that the measuring devices, transmitters and receivers, need to be deployed in a quantity sufficient to measure ranges that form a network of satisfactory geometric strength to be able to resolve the distances of interest. The network formed will only resolve the distances between transmitters and receivers, and if they cannot be put on the seismic elements themselves there is an offset to account for that will add uncertainty to the determination. A seismic source, for instance an air gun, may experience vibrations with acceleration forces up to several hundreds times the gravity acceleration when set off. It is thus a challenge to make devices that contain sensing elements or electronics to survive in this environment. Another difficulty is the acoustic environment around a seismic source. Acoustic noise and air bubbles in the water create problems when one wants to measure the time delay of an acoustic signal travelling the direct path, i.e. a straight line, from transmitter to receiver when most of the signal is diverted. Acoustic ranging is also subject to errors due to ray bending and boundary reflection. Underwater photogrammetry using stereo images is known in conjunction with underwater construction work, but to date is not known to have been used in seismic exploration.

The methods and systems of the present invention use optical devices to determine the size, shape and position of an underwater seismic spread component. A major obstacle in using light, visible, infrared or ultraviolet, in water is that it is dispersed very quickly so that it does not penetrate very far. Clay substances or other substances in the water may add to this problem. Towed marine seismic equipment is normally operated in relatively clear water and dimensions of most spread components, except for streamer cables, do normally not exceed 10-20 meters. This opens for the possibility of using light to measure geometry of marine seismic spread components, including marine seismic sources and sections of streamers.

There are at least two ways light may be utilized in methods and systems of the invention to measure geometry of marine seismic components. One group of methods and systems use one or more lasers to point at a reflector and measure the two-way travel time. This approach may resemble acoustic ranging methods in that a network of optical ranges may be calculated. An advantage over the acoustic approach is that only a simple reflector is needed at the end of the ranges. One could use reflective tape, reflective paint, prisms, or similar functioning devices that attach directly on the spread element surface, integrated into the surface, or the surface of the spread element itself could be reflective. The laser would not necessarily need to be co-located with a spread element whose geometry is being calculated. Another group of methods and systems use photographic images. Using stereo images it is possible to determine the shape of a spread component or spread element, but in order to determine size it is necessary to have a reference baseline distance. The baseline may be the accurate distance between the focal points of two cameras, or it could be the distance between two points appearing in the images. If there is sufficient light to obtain contrast in the images nothing more is needed to complete the data acquisition. The contrast may be improved by applying artificial light in various forms as explained herein. Methods and system of the invention are more fully described in reference to the following discussion of the drawing figures.

Referring now to the figures, FIGS. 1-8, inclusive, are highly schematic plan view illustrations, not to scale, of eight non-limiting embodiments of the invention. The same reference numerals are used throughout the various figures to point out the same or similar features, and each figure includes a direction arrow "F" indicating the direction of flow or travel of the particular spread component or spread elements illustrated. FIGS. 1-4 illustrate four embodiments of the invention using laser ranging. Arguably, the most accurate way of distance measurement available today using light is the approach used in electronic distance measurement (EDM) devices. This approach depends to some extent on a continuous signal while measuring although some interruptions are tolerated. A common way of measuring distance using a laser is to send pulses and measure the time delay of the reflected signal. In either case it depends on a beam pointing directly on the reflector or the reflective surface. Embodiment 100 illustrated in FIG. 1 depicts schematically a group of underwater marine seismic source elements 2, which may be the same or different, and may be selected from air-guns, vibrators, and the like. Source elements 2 collectively form a marine seismic source. As earlier stated, it would be possible to achieve higher-quality marine seismic data if distances such as distances between each source element 2 were known to a high degree of accuracy. Distances $d_1$ and $d_2$ are examples of these distances. An optical device 4, such as a laser in this embodiment, directs a focused beam of light (indicated by the dashed lines) directly at three of source elements 2 at successive times. Laser 4 would be out of plane, probably below the plane of source elements 2, although in this embodiment this is not necessary.

Figure 2:
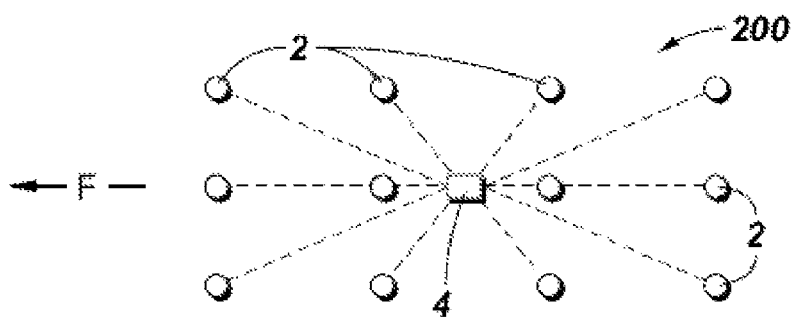
Figure 3:
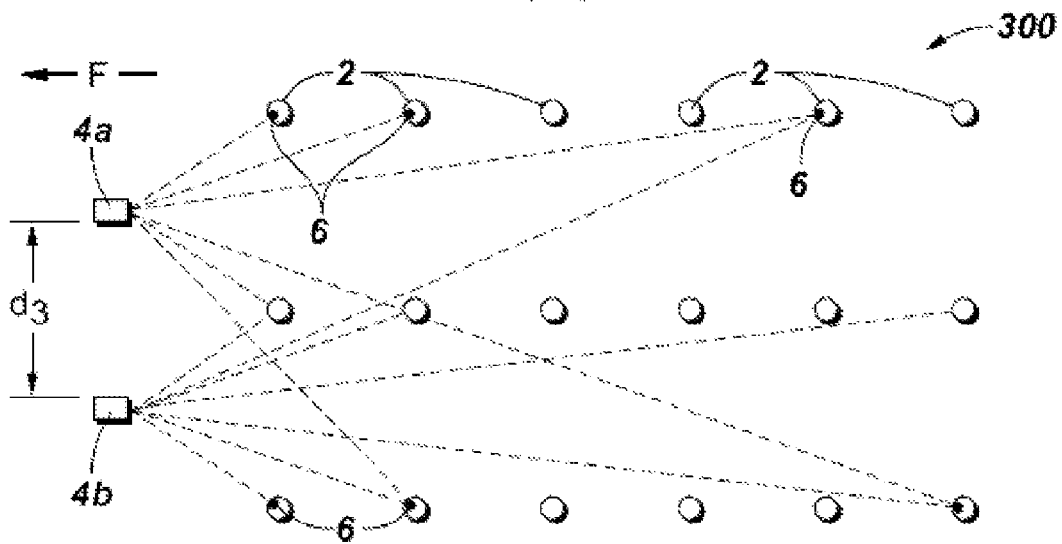
Figure 4:
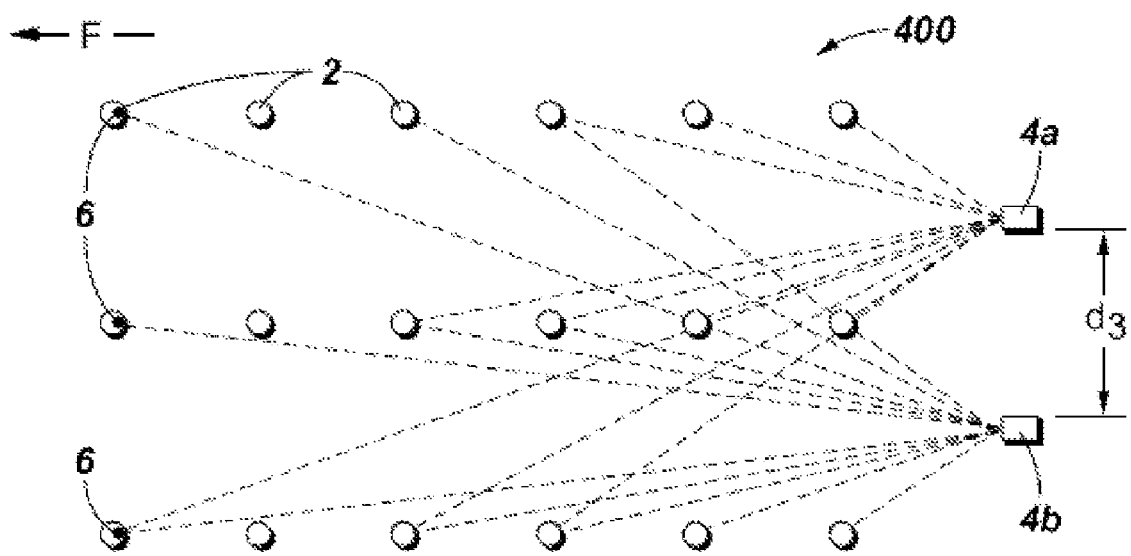

The typical embodiment of a marine seismic source may not offer a stable mounting platform where correct pointing direction of an optical device such as laser 4 could be ensured. This problem may be solved using an optical scanner, in some embodiments a laser scanner. One way of making a laser scanner is to supply a rotating mirror or a prism that bends the light ray so that each light pulse is sent in a different angle forming a fan of light pulses. Using a second mirror or prism it is possible to direct the light pulses in a spherical sector large enough to ensure that there is a pulse hitting each spread element 2. Such an embodiment 200 is illustrated schematically in FIG. 2, where laser 4 is converted into a laser scanner by use of such optical techniques. As illustrated in FIG. 2 by dashed lines, laser scanner 4 may scan all source elements 2 and calculate distances indicated by the dashed lines, enabling a more accurate estimate of position of all source elements 2. Optical scanner 4 in this embodiment may be positioned near the center of the seismic source and in a plane slightly above or below the plane of source elements 2, in all cases underwater.

In certain embodiments it would be desirable to calculate a network of ranges measured. At least two optical scanners 4a and 4b may be used, such as depicted schematically in embodiments 300 and 400 of FIG. 3 and FIG. 4, respectively, wherein optical scanners 4a and 4b are positioned ahead of (or behind) and in a plane slightly above or slightly below the plane of spread elements 2. A known baseline distance in embodiments 300 and 400 may be a distance $d_3$ between optical scanners 4a and 4b, which might be separated a known distance apart on a platform, or connected by a rigid member of known length (not illustrated). The platform or rigid member may allow distance $d_3$ to be adjusted manually or automatically, as desired.

On one or more, or each source element 2 that requires determination of relative position it would be desirable in most embodiments to have a dedicated means for reflecting the optical signal back to one or more optical scanners 4. This may be accomplished by providing means for reflection 6 on, integrated into or as a part of one or more spread elements, so that light reflected from the means for reflection has a significantly higher intensity than other reflections from the spread elements. This technique would identify the reflection means on each spread element as a target point of interest and thereby extract only those range measurements for use in the network computation. Otherwise, an enormous amount of range data would be collected, including a lot of less useful range data that had to be filtered out before the remainder could be used in calculating a network of optical ranges. Embodiments 300 and 400 may be modified as discussed in reference to embodiment 200 of FIG. 2 to comprise optical elements capable of changing direction of light beams from optical devices 4a and/or 4b so that it is possible to direct the light pulses in spherical sectors large enough to ensure that there are light pulses hitting each spread element 2.

The means for reflection could be any known means for reflection, for example a piece of reflective tape, reflective paint, a simple reflector such as used on cars and bicycles or by pedestrians, or a prism. The means for reflection may be retroreflective (sometimes referred to as reflex-reflective), or comprise retroreflective elements attached to a non-reflective backing. Retroreflective articles are known but their use in marine seismic surveying has not been suggested. Retroreflective articles may be based on retroreflective base sheeting selected from embedded lens sheeting, encapsulated lens sheeting, cube-corner sheeting, and combinations thereof. U.S. Pat. Nos. 3,922,065; 3,417,959; 4,332,437; 4,182,548; 3,585,415; and 3,935,365, all of which are incorporated by reference herein, all disclose cube-corner sheeting retroreflective articles, primarily tapes for roadway markers and vertical road signs, which may be useful in the practice of the present invention. For example, the 437 patent discloses a sheet form retroreflector of relatively simple design which has efficient retroreflectivity and which is stated to be particularly well suited for use as a retroreflective tape, either as a road tape or as a vertical sign. The light-reflecting units are shielded by the tape rather than exposed by it, so that the units are protected against wear and destruction by the elements such as rain (although this is not a problem in the present invention). In one form, the retroreflective marking material may be fabricated from an organic polymeric resin in the form of a sheet having at least some light-transmitting portions, a light-refracting surface on one side, and a plurality of trihedral light-reflecting units having three mutually perpendicular facets on the other side, such other side being adapted to being adhered to a surface of a spread element. As a modification, light-receptors may rise above one side of the sheet and be spaced along one direction of the sheet, or the trihedral light-reflecting units may be shielded by being placed on the other side of the sheet or at the interface between the sheet and the light-receptors. The light-reflecting units may be coated with metal to aid in their reflecting function and may be arranged to be bidirectional with respect to retro-reflecting light.

As previously noted, retroreflective articles are known but their use in marine seismic surveying has not been suggested. One possibility maybe the characteristic discussed in U.S. Pat. No. 5,054,272, incorporated by reference herein, which notes that the earliest retroreflective sheeting had an exposed-lens construction, but its reflex-reflective light was blanked out when the lenticular surface of the exposed lenses was covered with water. This problem was answered by enclosed-lens retroreflective sheeting as first taught in U.S. Pat. No. 2,407,680, wherein the lenses were embedded within sheeting having a flat, transparent cover film. This allowed incident light rays to be focused onto the specularly reflective layer irrespective of whether the front of the sheeting was wet or dry. Another patent, U.S. Pat. No. 3,190,178, incorporated by reference herein, solved the same problem in a different way, namely, by modifying retroreflective sheeting of the exposed-lens type wherein lenses are partially embedded in a binder layer. In the 178 patent, the exposed lenses are protected by a cover film to which the binder layer is sealed along a network of interconnecting lines, thus forming a plurality of hermetically sealed cells within which the lenses are encapsulated and have an air interface. Such exposed-lens sheeting is called "encapsulated-lens retroreflective sheeting". Enclosed-lens retroreflective sheeting generally comprises reflective sheeting having a polymer matrix thereon, with glass beads embedded in the matrix. A mirror or reflective surface, generally formed from a metallic vapor coat or the like, is formed on a back side of the polymer/bead composite. In typical operation, light passes through the beads, which individually act as lenses focusing the light and directing same against the mirror surface. The light is then reflected back through the beads, and toward the source. Typically, the mirror surface is separated from the glass beads by a spacing layer coat or spacecoat, which provides for a preferred focal length between the beads and the reflective surface. It is noted in the patent that one reason such embedded lens arrangements are useful, is that incident light rays are focused onto the reflective layer irrespective of whether the front of the sheeting is wet or dry. The elements of a typical enclosed or embedded lens retroreflective sheeting are: lens arrangement (beads imbedded in polymer), spacing layer (spacecoat), and reflector surface (vapor coat). The sheeting may include other elements such as an outer protective layer, and/or an adhesive layer for mounting. The end product will generally be referred to as an enclosed (or embedded) lens retroreflective sheeting, regardless of the process of its formation. In a typical application, the reflective surface is formed as a layer having a plurality of cupped or concentrically coated portions or concave portions, one each of which is in association with each bead or embedded lens. The concentrically coated portions facilitate a desired reflection of light which has passed through the lenses, regardless of the direction from which the light initially impinges onto the sheeting. In part, the cupped construction of the mirrored surface ensures that much of the light reflected by the retroreflective surface is directed back toward the source. Enclosed-lens retroreflective sheeting and the use of glass beads to provide for reflex light reflectors are described in U.S. Pat. Nos. 2,407,680; 4,626,127; 4,367,857; 4,511,210; and 4,569,920; these references being incorporated herein by reference.

Patents disclosing encapsulated-lens retroreflective sheeting include the above-mentioned U.S. Pat. No. 3,190,178 as well as U.S. Pat. Nos. 5,066,098; 5,064,272; 4,897,136; 4,896,943; and 4,075,049, all of which are incorporated herein by reference.

In certain embodiments such as depicted in FIGS. 1-8, water may contain small air bubbles that will disperse the light so that the rays do not hit the intended targets, which may be the afore-mentioned means for reflection. Methods of the invention include those wherein the size of the light beams and/or the means for reflection are adjustable so that a light ray passing a few millimeters to the side of the bubble will still hit the intended target and make a measurement possible.

Lasers have the ability to perform very fast measurement cycles and an advantage of that is that measurements can be taken almost continuously. When the spread elements are seismic elements, this means that measurements can be taken almost continuously through firing of the source elements. At some time after the source element is triggered, measurements may fail to be useful, for instance when using air guns the water will be filled with air bubbles. However, the geometry sought is exactly that geometry representative at the moment the air gun fires. The fast measurement cycles make it possible to select the data set taken closest to the time of firing and calculate a network solution from that data set. The rest of the data may then be discarded. The calculation may comprise computing a network, and this may include one or more computers to receive the measured ranges and process the data using an appropriate algorithm. If the computer has capacity and there is a desire to track a spread component between seismic shots it is of course within the invention to also compute updates more frequently.

In calculating geometry for any spread component, whether one-dimensional, two-dimensional, or three-dimensional, all optical devices (for example lasers) and reflectors, if used, will become nodes in a positioning network. Additional information may be required to determine size and geometry of the spread component. For example, some one-dimensional embodiments may not require additional information if all that is needed is a measurement along the body of the spread component (e.g. a streamer). In some two-dimensional embodiments where it is desired to determine the horizontal shape of a streamer, one may measure from the side. If the receiver intervals are known, then enough information is available to determine the triangles. However, this is a special case. If two lasers are used it is sufficient to know only one of the intervals to determine all receivers, and this is the general two-dimensional embodiment. If three lasers are employed in three-dimensional embodiments it is sufficient to supply one triangle to complete one tetrahedron with the measurements. However, a three-dimensional embodiment using less than three lasers would require knowing all triangles between the receivers, which may not be practical. Thus, other information or measurements may be required in a two scanner or three scanner system, such as pressure (depth) sensors, chains from surface that controls depth, acoustic depth measurements, and the like.

Optical scanners useful in the invention may emit visible light, for instance red, blue-green, or invisible light, for example near-infrared or ultraviolet. Optical scanners for different wavelengths may be used if an image or video of the spread component is desired. Lasers able to operate underwater are disclosed, for example, in U.S. Pat. No. 6,946,618, incorporated herein by reference, which discloses an underwater laser processing apparatus, including an optical unit that irradiates a condensed laser beam generated by a laser oscillator to a certain point of an underwater workpiece to weld the workpiece. One laser described as useful is a YAG laser oscillator, a wavelength of 1.06 μm, an output power of between 0.5 and 4.0 kW. Lasers need not be powerful enough for laser welding for use in the methods and systems of the present invention. Another useful laser includes a mode locked Nd:YAG laser outputting light pulses (a beam) with a pulse width (duration) of approximately 32 picoseconds and with a center wavelength of 1.064 microns as described in assignee's U.S. Pat. No. 6,252,222, incorporated herein by reference. Other useful lasers include excimer lasers.

If the position of at least any two points in the optical network is determined in an external reference frame, e.g. a global frame, the positions of each spread element may be calculated in the same reference frame should need be. If the network is 3D then at least three points need to be determined externally or some other information as mentioned above needs to be added. The external position could be determined using for instance an acoustic positioning system in combination with a satellite positioning system.

Figure 5:
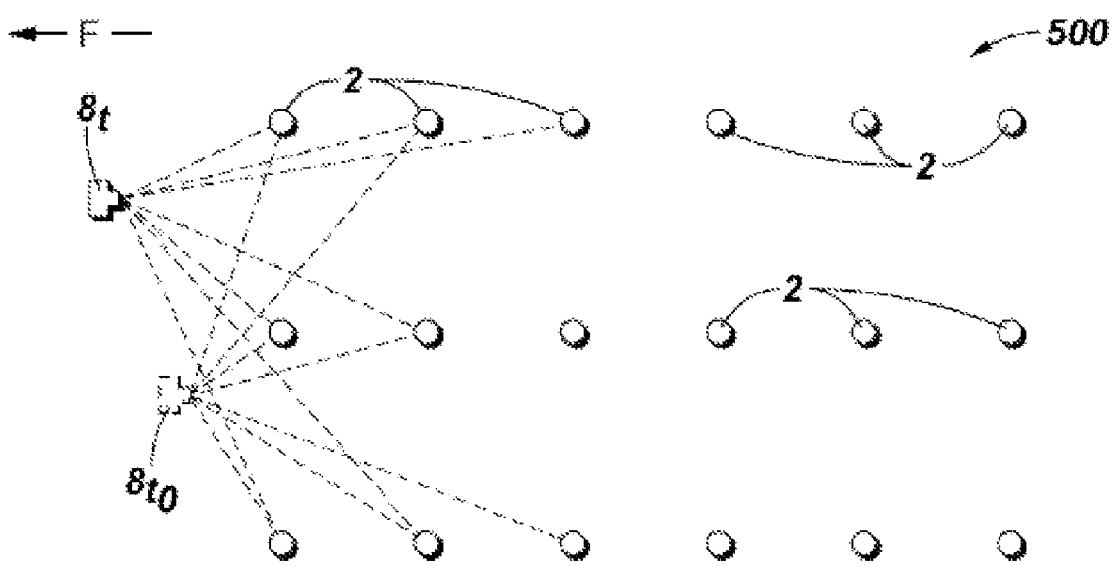
Figure 6:
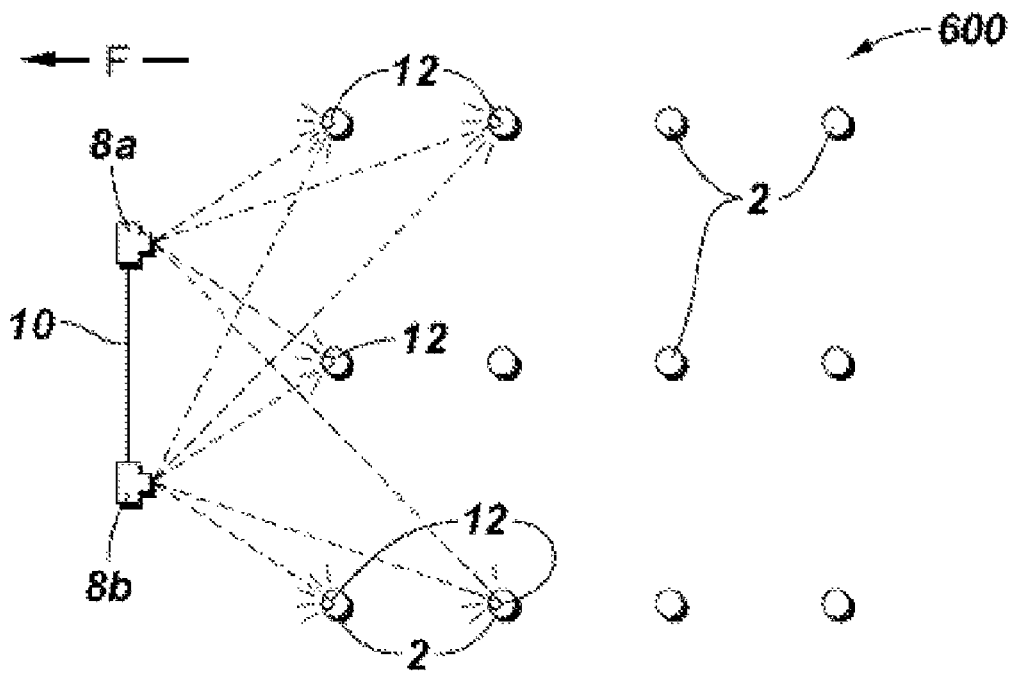
Figure 7:
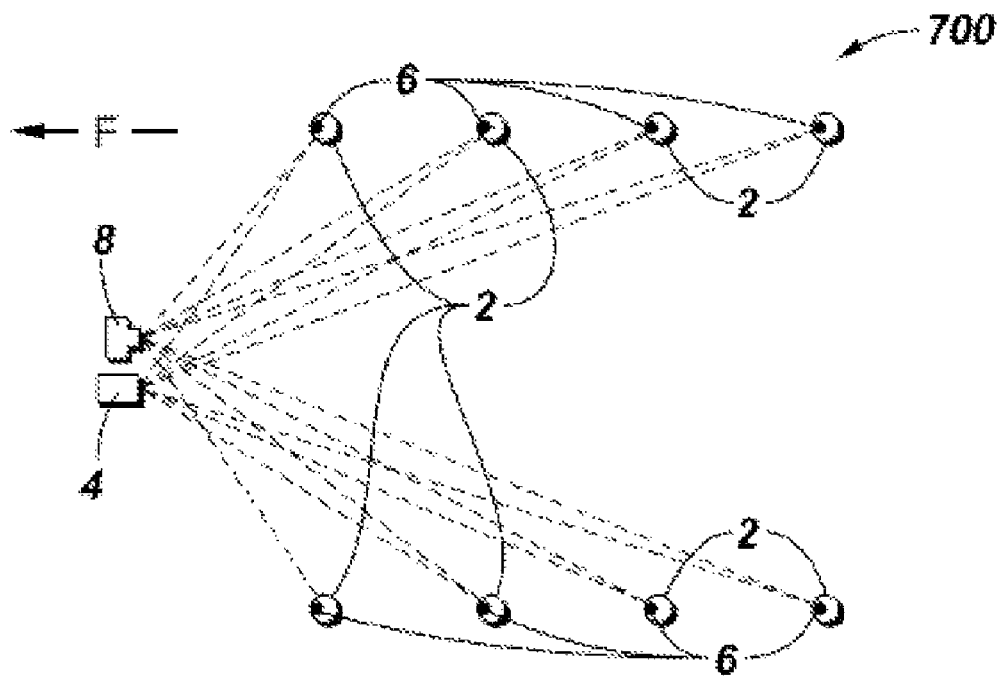
Figure 8:
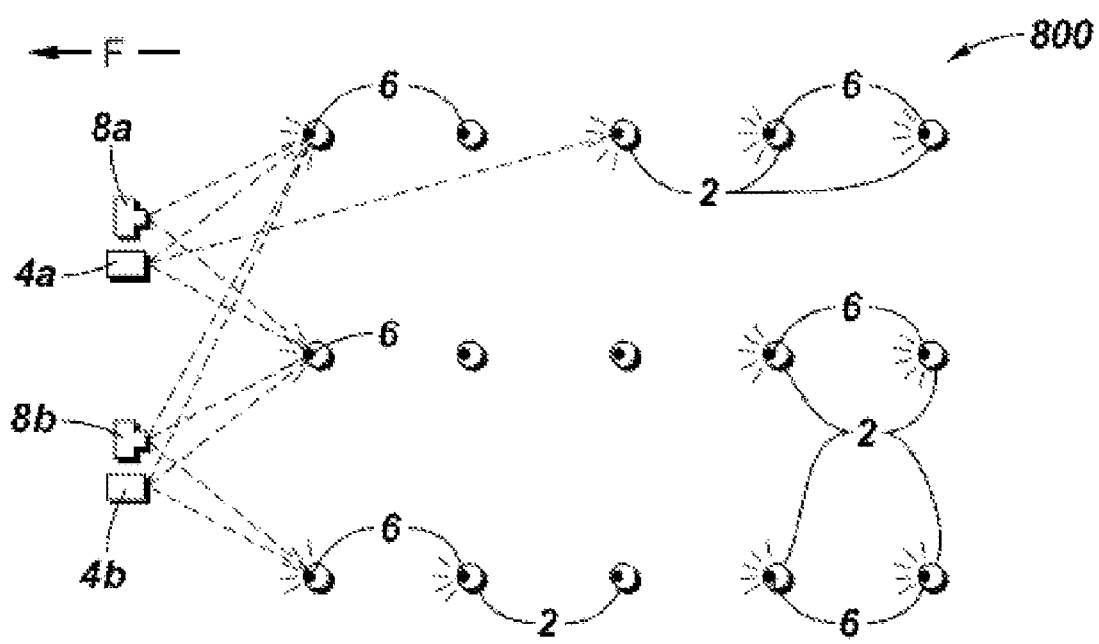

Another group or set of methods within the invention include those wherein the optical device comprises at least one camera compatible with marine conditions, as illustrated in FIGS. 5-8. A first embodiment 500 is illustrated schematically in FIG. 5. In some embodiments, such as illustrated in FIGS. 6 and 8, two or more cameras may be used. In essence, these methods comprise taking stereo photographic images of the spread component of interest. Using stereo images it is possible for example to determine geometry, such as shape, of a seismic source, or a seismic streamer. To achieve a "pseudo-stereo" image using one camera, a camera $8_{t0}$ to is depicted in FIG. 5 in phantom at a first imaging time "$t_0$", and again at a slightly later time "t" at $8_t$. Dashed lines indicate some of the lines of sight from camera 8 to spread elements 2 of the photographs taken, although it will be appreciated that whatever objects are in view of the camera lens will be recorded photographically by camera 8 at the two times $t_0$ and t. If the relationship $|t-t0|$ is sufficiently small compared to the accuracy of the method and the temporal geometry variation of the spread component so that it does not significantly degrade the performance of the method, the two photographs might be considered to have been taken simultaneously, and any difference would likely be correctable by a suitable algorithm.

Another embodiment 600 using two cameras 8a and 8b is illustrated schematically in FIG. 6, wherein two cameras 8a and 8b are connected by a platform, or an adjustable rigid member, represented by line 10, and positioned slightly below or above a plane roughly defined by three or more spread elements 2. Additional cameras may be used if desired, for example positioned in the rear of the spread component. For example, cameras 8a and 8b might be in a plane slightly below the plane of the spread elements, and another set of two cameras positioned behind the spread elements and in a plane slightly above spread elements 2. Cameras 8a and 8b may be timed to expose simultaneously the spread component formed by the plurality of spread elements 2. In order to determine spread component size it is necessary to have a known reference baseline distance. The baseline distance may be given as an accurate distance between the focal points of cameras 8, or it could be given as the distance between two points appearing in the images, or by two points on the platform or adjustable rigid member 10.

The quality of the images may be an issue for a successful process. In daylight conditions and clear water it may be possible to take the snapshots without adding any light. If there is sufficient light to obtain good contrast in the images nothing more is needed to complete the data acquisition. The contrast may be improved by applying artificial light in various forms, such as attaching lights 12 to appropriate places on one or more spread elements. Methods of the invention include enhancing contrast in the images using artificial lights to ease identification of the correct marks. The artificial lights could for instance be obtained from an ordinary flash. A better approach may be to position lights in place of the marks on the spread elements. Optional methods include adjusting the intensity to maximise the contrast under the given conditions, and using monochromatic light sources of different color or wavelength to help identify the marks in the images and distinguish them. Yet another option is to install a laser scanner 4 close to a camera 8 and use means for reflecting 6 on the spread elements as illustrated schematically in FIG. 7 by embodiment 700. If light sources providing infrared or ultraviolet light are used, and cameras sensitive to these wavelengths, it is also possible to use invisible light sources. Combinations of optical scanning and camera methods, such as co-locating a laser scanner 4 and a camera 8 as illustrated in FIG. 7, offer the advantages of both methods. Laser scanner 4 has in these embodiments a dual function in that it illuminates reflectors 6 on spread elements 2 to create good contrast in the image and measures the ranges at the same time. Optionally, the methods comprise positioning camera 8 and laser scanner 4 in a center position ahead of the seismic source, which might be a more practical way of deploying the gear. This combined approach will also work for spread components having three dimensional geometry. The positioning principle used in these methods is essentially that the images will provide angles, or directions if you like, between/to the reflectors while the laser scanner provides the distances. Given the direction of a vector and its length it is trivial to find its end point coordinates. In order to establish coordinates in an external reference frame using these methods, one option comprises positioning two or more points externally and transform coordinates based on this. Another option comprises measuring the position and three-dimensional attitude of any part or element of the spread component using, for instance, an acoustic positioning system and satellite positioning system, and an inertial platform on the unit.

Methods in accordance with the invention include measuring image coordinates of one and the same point or mark on a spread element in two images exposed at two different locations. This makes it possible to determine the 3D coordinates of the point in a stereographic model. Repeating this process for a multitude of points makes it possible to determine their relative positions. As the number of points increases the stereographic model becomes closer to a three-dimensional image of the spread component. The cameras may be calibrated to reduce or eliminate distortions of the lenses, deviation of the projection surface from a plane, and other effects affecting the image coordinates. Given this information the errors can be compensated for. Thus, other inventive methods comprise determining shape of a spread component using calibrated cameras, and optionally obtaining the size (scale) of the spread component using a known baseline distance, which may be selected from a distance between two cameras, a known distance between two marks on a spread component or spread element, or a measured distance, for instance the distance from a camera to a mark on a spread element.

FIG. 8 combines all previously discussed features, illustrating in embodiment 800, including dual optical scanners 4a, 4b, dual cameras 8a, 8b, means for reflecting 6 and light 12 on some or all of spread elements 2. Methods and systems in accordance with embodiment 800 may be a further advantage in difficult environments, providing superb redundancy within the system. The methods would then be far more tolerant to failed or false measurements.

As mentioned in the Summary, another inventive method uses an "imaging laser scanner", where rather than using co-located camera and laser scanner pairs, the functions of imaging and laser scanning are combined in one unit; one or multiple imaging laser scanners may be employed in the exposure step. Imaging laser scanners are known and used in non-marine situations to map large constructions (see for example http://www.trimble.com/trimblegx.shtml) or to map terrain using an aircraft, such as a helicopter (see for example http://gis.lcica-geosystems.com/LGISub1x3x0.aspx). They measure distances by use of each of a plurality of laser pulses, and tracks the angle of the pulsed beams, so that each measurement fits into a known pixel of an image. Combined with the intensity of the reflected signal this forms another type of image that may be used. The difference from using a camera is primarily that a simultaneous exposure of the whole image is not obtained using an imaging laser scanner as would be obtained if exposure occurs through a camera lens. Also, significant scanning time may cause some distortion of the image (and distances) if the imaging laser scanner is not stationary (or the movements compensated for).

Photographic methods of the invention (including imaging laser scanning) may be automated. One automation technique would be to use digital cameras, digital imaging laser scanners, or digital video cameras, either of which enables fast data update rates. As with laser ranging one could then choose the image nearest to the time of interest to use for processing to find the geometry wanted, or images could be processed at the rate a computer has capacity to support. Cameras suitable for use in underwater activities are described in U.S. Pat. No. 6,987,527, incorporated herein by reference, which describes a weatherproof and watertight digital camera that is designed to operate both on land and underwater to great depths. The camera may be hermetically sealed, and is thus impervious to contamination both from the atmosphere—such as may arise from wind-blown sand and smoke—and from water and like fluids, including during full immersion including at great depths and pressures. The camera may be totally encapsulated by being cast in plastic, with no seals or penetrating pins, wires or other objects, but may be retrieved from its encasement if required or desired. The encapsulated digital cameras may be produced having no air spaces inside, which can therefore be used at extreme depths, and the encapsulated digital cameras may include adjustable optics that are immersed in water when the digital camera is placed in water. The optics are thus adjustable without necessity of being placed in a watertight enclosure.

Variations of these methods include processing the images in a computer with one or more algorithms to convert pixels to desired coordinates, and such methods may include image recognition, filtering and/or other means for identification of the node points in the images. This process may comprise the steps of, A. for each point of interest, i.e. the reflectors, and in both images,
  a. identifying pixels representing the mark in the image using some form of pattern recognition technique);
  b. optionally, translating the image coordinates to coordinates in another coordinate system;
  c. correcting the image coordinates of the identified pixels (or fractions of pixels) for camera distortion;

B. using the corrected image coordinates as input together with the knowledge of one or more baseline length(s) in a ray bundle adjustment augmented (or extended) with range measurements (ray bundle adjustment is a well-known technique within the art of photogrammetric imaging; the baseline information may be given as a distance or in terms of known (or chosen) coordinates);

C. optionally displaying the results of the ray bundle adjustment positions in local coordinates, or in an external reference frame directly if coordinates of one or more marks or cameras were given in that reference frame; and D. optionally repeating these steps whenever images are available and an update is desired.

In some embodiments it may be necessary or desirable to calculate depth of a spread component or spread element. For this purpose the teachings of assignee's co-pending patent application Ser. No. 11/083,669, filed Mar. 18, 2005, (14.0282) incorporated herein by reference, may be employed. The co-pending application describes methods and systems for determining vertical position of marine seismic components, in particular seismic source elements, in reference to a mathematically described surface rather than the sea surface. The seismic data is normally organized in lines, and in 3D seismic as well as in 4D the data from adjacent lines needs to be given a common reference in order to yield the best precision. Two adjacent lines may be acquired at different time of day and at different days, and the sea surface is then most certainly at different level at the two epochs. The sea level is affected by external forces, such as astronomical and meteorological tides, air pressure, currents, wind, to name a few. To some degree of accuracy it may be possible to compensate for the effect of astronomical tides based on data from tide tables. Although the astronomical tide can be predicted very accurately for periods of several years the accuracy is often dramatically reduced as the data needs to be extrapolated from the tabled port nearest to the survey area using inaccurate models to estimate time shift and amplitude of the tide. The other effects are hardly predictable at all.

Although conventional ways of determining depth of marine seismic sources using chains of known lengths connecting them to a flotation device may be used for source elements, and pressure gauges to determine the water column above a seismic receiver and streamer cables, both fall short in that they just provide a depth relative to the actual sea surface. There is no means by which the vertical reference can be re-established with any degree of accuracy months and years later as is required in for instance time lapse seismic surveys (4D seismic). Given that the vertical distance of the source and the receivers from a fixed horizontal reference surface (or datum) could be measured it is possible to refine the accuracy of the vertical correction of the seismic signals. Assignee's co-pending application offers methods, apparatus, and systems to determine these values in a reference frame fixed to the Earth and being independent of the actual level of the sea surface. The methods described therein comprise processing position measurement signals received by a first antenna on a first marine seismic spread component to determine a 3D coordinate position of the first antenna; receiving position measurement signals by a second antenna; combining the measurement signals received by the first and second antennas and processing a combined data set to estimate a spatial vector between the first and second antennas; adding the spatial vector to the 3D coordinate position of the first antenna to provide a 3D coordinate position of the second antenna; using the 3D coordinate position of the second antenna to calculate a 3D coordinate position of a seismic source unit or receiver; and calculating a vertical correction for reflected seismic signals received by the receiver. The methods described include those wherein the 3D coordinate position of the second antenna are used to calculate the position and/or orientation of a spread component, such as a float, source units such as air-guns, streamers, and individual receivers or groups of receivers in the streamers. The methods may also include receiving of sufficient signals by multiple positioning system transmitters, which may be multiple satellite positioning system transmitters. The satellite positioning system, if used, may be selected from any functioning system, or future functioning system, or alliance of systems.

A typical use of the methods and systems of the invention will be in 4-D geophysical imaging, where a 3-D seismic survey is repeated over a grid that has been previously surveyed. This series of surveys taken at different times may show changes to the geophysical image over time caused, for example, by extraction of oil and gas from a deposit. When acquiring seismic data over weeks and months as is typical for a seismic 3D survey it is important that the whole data set can be referenced to the same level with a precision and certainty. 4D seismic requires data sets acquired at intervals over years to be compared looking for the subtle changes in the subsurface as an oilfield gets produced. Using the methods and systems of the invention, the geometry (shape, size, and relative positions) and depth of the various spread components and spread elements may be determined. Depth may be determined with respect to a reference that can be reconstructed with a high degree of precision at any future or past time epoch. This is in contrast to the sea surface referenced data that can only be approximated at a different time given that accurate environmental information is available. In 4-D seismic it is important that the source elements being used to generate the acoustical pulses be located as closely as possible to the same location as in previous surveys over the same grid. This has previously been difficult to accomplish in a marine survey because the acoustical source members are typically towed behind the tow vessel in source arrays, which are subject to wave and current movement.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising: exposing a seismic source to an optical signal from a laser positioned near a center of the seismic source; reflecting a portion of the optical signal by one or more reflectors disposed on two or more spread elements of the seismic source; calculating a geometry of the seismic source by using travel time for the optical signal to travel to and return from the two or more spread elements; and producing a network of optical ranges, wherein each end of the network of optical ranges corresponds to reflectors.

2. The method of claim 1 wherein each reflector is 1) an optical reflector attached directly on the two or more spread elements; 2) an optical reflector integrated into the two or more spread elements; 3) an optically reflective surface or portion of a surface of the two or more spread elements; or combinations thereof, wherein the optical reflector is selected from a prism, a mirror, a reflective tape, reflective signage, reflective symbols, and combinations thereof.

3. The method of claim 1 wherein the optical signal is selected from continuous and discontinuous signals.

4. The method of claim 1 comprising identifying a reflection point as being a target point of interest, extracting a range measurement for use in a computing an optical network, and filtering out less useful range data before computing the optical network.

5. The method of claim 2 comprising adjusting optical signal beam size and/or reflector size to compensate for dispersion of the optical signal.

6. The method of claim 1 wherein the calculating geometry occurs virtually continuously and uses one or more algorithms stored on a computer.

7. The method of claim 1 comprising measuring position and three-dimensional attitude of any spread component using a positioning system selected from an acoustic positioning system, a satellite positioning system, an inertial platform, and combinations thereof.

8. The method of claim 1 wherein the calculating geometry comprises using a computer selected from a vessel-located on-board computer, a remote computer, and both.

9. The method of claim 1 wherein the seismic source has dimensions selected from one dimension, two dimensions, and three dimensions, and wherein one or more additional geometric measures are used to calculate size of the seismic source.

10. The method of claim 1, wherein calculating the geometry of the seismic source comprises determining one or more distances between the two or more spread elements using the travel time for the optical signal to travel to and return from the two or more spread elements.

11. The method of claim 1, wherein the optical signal is emitted through water.

12. The method of claim 1, wherein the laser is disposed under water.

13. The method of claim 1, wherein exposing the seismic source to the optical signal comprises:
directing the optical signal at one or more mirrors; and
rotating the one or more mirrors such that the optical signal is sent in one or more directions.

14. A system comprising:

at least one laser configured to expose a seismic source to an optical signal, the seismic source comprising two or more spread elements, wherein each of the two of the spread elements has an optical reflector, and wherein the at least one laser is positioned near a center of the seismic source; and a calculation unit configured to:

receive data from the optical reflector;

use at least some of the data to calculate geometry of the seismic source; and produce a network of optical ranges, wherein each end of the network of optical ranges corresponds to the optical reflector.

15. A method comprising:

exposing a plurality of underwater marine seismic sensors to an optical signal from one or more lasers positioned above or below the underwater marine seismic sensors, wherein the optical signal is emitted through at least two mirrors to project the optical signal in a plurality of directions, wherein the plurality of directions is shaped as a sphere;

reflecting at least a portion of the optical signal by a reflector disposed on each of the underwater marine seismic sensors; and producing a network of optical ranges, wherein each end of the network of optical ranges corresponds to the reflector, wherein the network of optical ranges corresponds to the plurality of underwater marine seismic sensors.

16. A method comprising:

exposing a plurality of underwater marine seismic sources to an optical signal from one or more lasers positioned above or below the underwater marine seismic sources, wherein the optical signal directed at a rotating mirror and a prism to project the optical signal in a plurality of directions, wherein the plurality of directions is shaped as a sphere;

reflecting at least a portion of the optical signal by a reflector disposed on each of the underwater marine seismic sources; and producing a network of optical ranges, wherein each end of the network of optical ranges corresponds to the reflector, wherein the network of optical ranges corresponds to the plurality of underwater marine seismic sources.

* * * * *